June 3, 1958  J. R. OISHEI ET AL  2,836,841

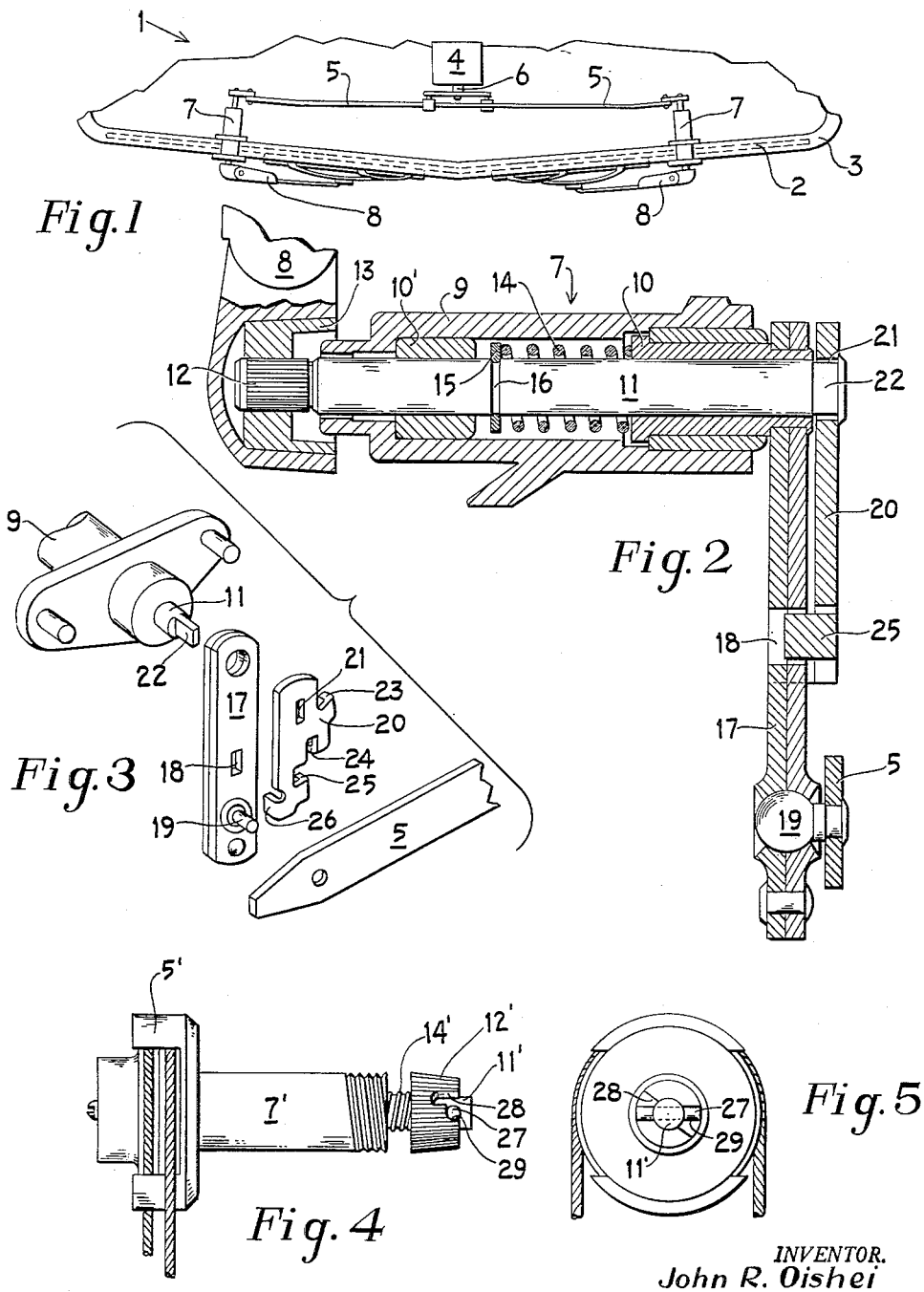

WINDSHIELD CLEANER PARKING INSTALLATION

Filed April 8, 1954  2 Sheets-Sheet 2

INVENTOR.
John R. Oishei
BY William C. Riester

Beau, Brooks, Buckley & Beau
Attys.

United States Patent Office 2,836,841
Patented June 3, 1958

2,836,841

WINDSHIELD CLEANER PARKING INSTALLATION

John R. Oishei, Buffalo, and William C. Riester, Eggertsville, N. Y., assignors to Trico Products Corporation, Buffalo, N. Y.

Application April 8, 1954, Serial No. 421,865

6 Claims. (Cl. 15—253)

This invention relates to a windshield cleaning system for automotive vehicles, and more particularly to the pivot shaft mounting of the wiper blades of such system.

The conventional windshield cleaning system comprises a motor and transmission means for imparting oscillatory movement to a plurality of pivot shafts mounted on the cowl of the vehicle and carrying wiping blades exteriorly of the shield. The motion so transmitted causes the wiper to oscillate across the shield within fixed limits, clearing the latter of precipitation. In many systems, such as those employing pneumatic motors, the blades automatically overtravel their running limits when they are being deactivated so as to park proximate to the lower molding of the shield out of the line of vision. For the most part however, those systems equipped with electric motors have no such automatic overtravel when parking. When deactivated, the blades remain at the lower running limit, well above the molding and clearly within the line of sight of the operator of the vehicle. This obstruction of vision is not only an annoyance to anyone peering through the windshield, but also presents a distinct driving hazard by diminishing the available visibility. It is for the purpose of eliminating this shortcoming of electric windshield wiper systems that the present invention is designed.

In accordance with the instant invention, the wiper carrying pivot shafts are equipped with manually disengageable clutch mechanisms. At the termination of any wiping operation, it is merely necessary to depress the wiper arm in the vicinity of the pivot shaft in order to disengage the clutch. After disengagement the wiper may be moved independently of its motive means and so be placed with facility proximate to the molding out of the line of sight. When the system is next activated, the clutch automatically engages so as to drive the wipers to and fro across the shield between their normal running limits.

Accordingly, it is the primary object of this invention to provide a windshield cleaning system wherein the blades may be positioned out of the line of vision when not in use.

For a greater comprehension of this and other objects of the invention, reference is made to the following description and accompanying drawings wherein:

Fig. 1 is a fragmentary bottom plan view of an automotive vehicle equipped with a windshield cleaning system constructed in accordance with the instant invention;

Fig. 2 is a longitudinal section view of the pivot shaft and clutch mechanism;

Fig. 3 is an exploded perspective view of the clutch mechanism;

Figure 9:
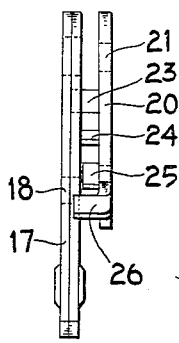
Figure 10:
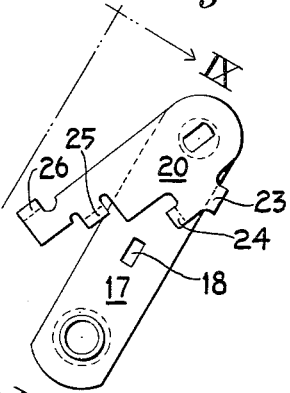
Figure 11:
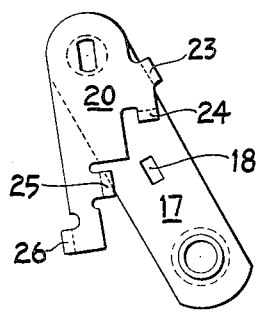
Figure 12:
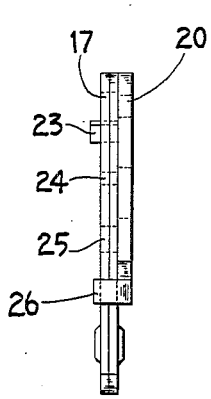
Figure 13:
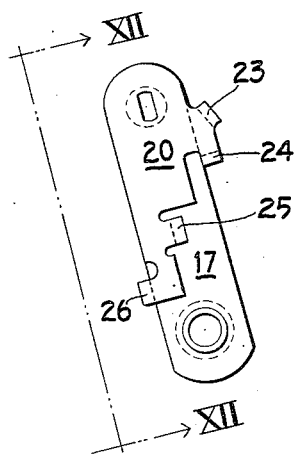
Figure 14:
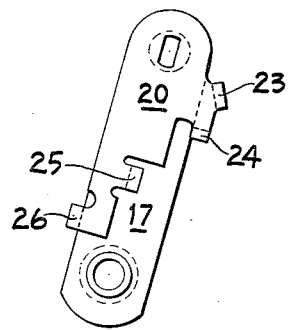

Figs. 4 and 5 are side and front views respectively of a modified form of the invention; and Figs. 6 through 14, with Figs. 9 and 12 taken on lines IX—IX and XII—XII of Figs. 10 and 13 respectively, illustrate a complete cycle of operation of the instant invention.

Referring now more particularly to the drawings, the numeral 1 generally designates an automotive vehicle having a windshield 2 mounted in molding 3. Electric motor 4 which may be of conventional design is conveniently mounted under the instrument panel in the passenger compartment of the vehicle. Connecting rods 5 are operatively connected to the drive shaft 6 of the motor and to pivot shafts 7 so as to convert the rotation of the motor to oscillatory motion at the pivots. Wipers 8 are mounted on the forward end of the pivots so as to oscillate therewith and clear the shield.

As best seen in Fig. 2, the pivot comprises a housing 9 adapted to be mounted on the cowl of the vehicle. Bearings 10 and 10' press fit into the housing rotationally mount shaft 11 having a knurled head 12 on its outer end. Wiper 8 is placed in driving engagement with the head by means of bur 13. Shaft 11 is urged outward, to the left in Fig. 2, by spring 14 compressed between bearing 10 and washer 15 mounted in groove 16 of the shaft. Crank arm 17 having a centrally located slot 18 is rotationally mounted on the rear of bearing 10 and is operatively connected to connecting rod 5 by means of ball and socket joint 19, while slot 21 of clutch lever 20 is drivingly engaged by the undercut portion 22 of shaft 11.

Referring now more particularly to Figs. 6–14, it may be seen that when the cleaning system is inactive with wiper 8 parked proximate to molding 3, crank 17 and clutch lever 20 are in spaced relation with obliquely extending ear 23 of the clutch being adjacent with the right hand edge of the crank while horizontal ear 24 abuts the outer surface of the crank. When the system is activated, crank 17 moves counterclockwise so as to drive wipers 8 across the shield from the right to left as indicated by the arrow in Fig. 6. During its counterclockwise motion, the crank carries clutch lever 20 with it because of the overlapping engagement of ear 23. This motion continues until the wiper reaches the point indicated in Fig. 7 and the crank that position indicated by Fig. 11. At this point the crank reverses its direction so as to rotate clockwise. It should be noted that in the first stroke and for reasons to be noted hereinafter, wiper 8 stops somewhat short of its outermost limit 8'. Wiper 8 remains in the position indicated in Fig. 7 as the crank 17 moves clockwise away from ear 23, the friction between the wiper and shield 2 being more than sufficient to overcome the sliding friction between horizontal ear 24 and the surface of crank 17. The configuration of the clutch lever is such that just as the crank passes out from under ear 24, vertical ear 25 is directly over slot 18 while the lower ear 26 is in the same plane as the left edge of the crank. At this instant, spring 14 which has been compressed between bearing 10 and washer 15 urges shaft 11 outward so that ear 25 passes into slot 18 while ears 24 and 26 firmly engage the right and left sides respectively of the crank. This is best illustrated in Figs. 2, 12 and 13. The crank and clutch are now in firm driving engagement with no relative motion being permitted between the two. As driving engagement between the clutch and wiper has existed from the start, the latter will move between its two running limits 8' and 8" as illustrated by the arrows in Fig. 8 while connecting rod 5 drives the crank between the extremes indicated in Figs. 13 and 14.

Figure 6:
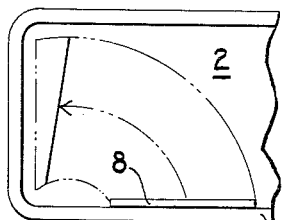
Figure 7:
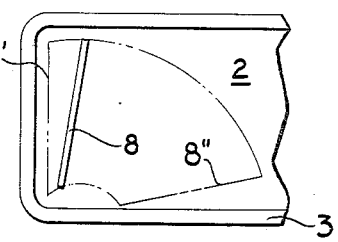
Figure 8:
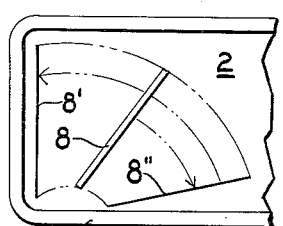

When the system is deactivated, the wiper will automatically come to rest at limit 8". In order to locate the wiper in the desirable position proximate to the molding 3 as indicated in Fig. 6, it is only necessary to depress the wiper arm so as to force shaft 11 backward against the resistance of spring 14 and thus disengage ear 25 from slot 18. The wiper may now be rotated to the desired position which brings oblique ear 23 into the vicinity of the right edge of the crank while horizontal shoulder- 24 rides on the surface of the crank, a position described above and illustrated in Figs. 9 and 10. The wiper system is disengaged and ready to commence another cleaning cycle.

It should be noted that the distance by which the wiper falls short of its outer limit during the first stroke is equivalent to the distance which the wiper is moved manually and independently of the crank. This lost motion is subsequently absorbed by the relative movement between the clutch and crank as the latter moves out of engagement with ear 23 and into engagement with ear 25. As a result, after ear 25 enters slot 18, the wiper will run between its normal limits 8' and 8" until again parked.

Referring now more particularly to Figs. 4 and 5 wherein a modified form of the invention is disclosed. Herein a conventional pivot 7' having the commonly employed cable drive 5' is illustrated. Pin 27 driven transversely through shaft 11' serves as a stop for knurled head 12' which is freely mounted on the shaft and urged outwardly by spring 14'. The wiper arm is normally attached to the head in the conventional manner. A close inspection of the figures will indicate that the head is provided with two radial notches 28 and 29 of different axial depths, with pin 27 resting in notch 29. When the system is activated, the frictional resistance of the shield upon the wiper is sufficient to hold the head stationary while the shaft rotates in a clockwise direction. This relative movement continues until notch 29 passes out from under the pin and spring 14' forces the head forward so as to engage pin 27 and notch 28. The wiper is now oscillated across the shield in the usual manner. When, at the termination of the cleaning operation it is desired to position the wiper proximate to the molding, it is only necessary to depress the arm, and therefore the head, against the resistance of spring 14' so as to disengage the pin and notch 28. The wiper may then be rotated to the desired position, the angularity of the sectors defined by notches 28 and 29 being just sufficient to relocate the pin in notch 29 during the parking operation.

It may therefore be seen that by employing the manually disengageable, automatically engageable clutch of the instant invention, the wiper may with facility be parked out of the line of vision when not in use. Further, when the system in activated, the clutch automatically re-engages without any additional manual operations being required of the operator and drives the wipers across the shield in the conventional manner.

Having thus disclosed exemplary embodiments of the invention, what is claimed is:

1. A windshield cleaning system for automotive vehicles comprising, a wiper, a transmission including a drive part and a driven part, said driven part being connected to the wiper for oscillation therewith as a unit, a clutch connecting said drive part and said driven part for movement in unison, actuating means connected to said drive part and operable to move the same back and forth across a definite path of operation, said actuating means being operable to arrest said drive part at an end of said path of operation, said clutch being operable to release said driven part for manual parking movement independently of said drive part and beyond such end of said path of operation, and clutch restoring means including stop means connected to one of said parts and engaging the other thereof to confine such manual parking movement of said driven part and cause said drive part to move said driven part back into said path for reclutching for continued operation when said actuating means again becomes operative.

2. A windshield cleaner comprising, a wiper, a two-part transmission member movable back and forth over a definite path of operation and including a drive part and a driven part, said driven part being connected to the wiper for oscillation therewith as a unit and having a parking movement beyond an end of said path of operation independent of said drive part thereby to enable the wiper being manually parked outside the normally cleaned area of a windshield, a clutch connecting said two parts for movement in unison through said path and operable to release said driven part from said drive part for such manual parking beyond said path of operation, actuating means connected to said same and operable to arrest the drive part at said end of said path, and clutch restoring means operable by said drive part to move said driven part back into said path for reclutching for normal wiper operation as said drive part is moved away from said end by said actuating means.

3. A windshield cleaning system for automotive vehicles comprising, a wiper for cleaning an associated windshield, a transmission including a drive part and a driven part, said driven part being connected to the wiper for oscillation therewith as a unit, a clutch positively connecting said drive part and said driven part for movement in unison, actuating means connected to said drive part and operable to move the same back and forth across a definite path of operation, said actuating means being operable to arrest said drive part at an end of said path of operation, said clutch having an interlocking element laterally displaceable from the path to release said driven part for manual parking independently of said drive part and beyond such end of the path of operation, and clutch restoring means operable by said drive part and including means connecting said driven part to said drive part for movement in unison to bring said interlocking element back into said path for reclutching for continued operation when said actuating means again becomes operative.

4. A windshield cleaning system for automotive vehicles comprising, a wiper for cleaning an associated windshield, a transmission including a drive part and a driven part, said driven part being connected to the wiper for oscillation therewith as a unit, actuating means connected to said drive part and operable to move the same back and forth across a pre-set running range, clutch means including a slot and mating ear detachably connecting said drive part to said driven part for movement in unison, said clutch means being manually disengageable for parking said driven part independently of said drive part and positively re-engageable after said drive part is moved across the path of operation and back toward its starting position, and means on one of said parts engaging the other thereof to limit the displacement of said ear from said slot and to connect said parts for movement in unison when said driven part is in parking position.

5. A windshield cleaning system for automotive vehicles comprising, a wiper for cleaning an associated windshield, a transmission including a drive part and a driven part, said driven part being connected to the wiper for oscillation therewith as a unit, actuating means connected to said drive part and operable to move the same back and forth across a pre-set running range, clutch means for positively connecting said drive part and said driven part for movement in unison in a definite path, said parts overlying one another and said clutch means including spaced portions on one part straddling the other part to interlock them together for such movement, said driven part being laterally displaceable from said drive part to permit the wiper to be parked beyond the path, said spaced portions including a portion interlocking said parts in parking position and acting to restore the displaced part back into the path of said drive part when next operated, and registrable means between said spaced portions to interlock the parts into operative relationship.

6. A windshield cleaning system for automotive vehicles comprising, a wiper for cleaning an associated windshield, a transmission including a drive part and a driven part, said driven part being connected to the wiper for oscillation therewith as a unit, actuating means connected to said drive part and operable to move said part back and forth across a pre-set running range, clutch means for positively connecting said drive part and said driven part for movement in unison in a definite path, said parts overlying one another and said clutch means including spaced portions on one part straddling the other part to interlock them together for such movement, said driven part being laterally displaceable from said drive part to permit the wiper to be parked beyond the path, said spaced portions interlocking said parts when in parking position and acting to restore the displaced part back into the path of said drive part when next operated, registrable means between said spaced portions to interlock the parts into operative relationship, and means interposed between said spaced portions for supporting said parts laterally displaced to permit the registration of said registrable means.

References Cited in the file of this patent

UNITED STATES PATENTS 1,419,601     Anderson _____ June 13, 1922

FOREIGN PATENTS 842,355     France _____ Mar. 6, 1939